(12) United States Patent
Raskin et al.

(10) Patent No.: US 6,291,558 B1
(45) Date of Patent: Sep. 18, 2001

(54) COMPOSITION BOARD BINDING MATERIAL

(75) Inventors: Mikhail Raskin, Stoughton; Lazar O. Ioffe, Boston; Azariy Z. Pukis, Marlborough; Martin H. Wolf, Weston, all of MA (US)

(73) Assignee: Cellutech, LLC, Everett, MA (US)

( * ) Notice: Subject to any disclaimer, the term of this patent is extended or adjusted under 35 U.S.C. 154(b) by 0 days.

(21) Appl. No.: 09/345,019

(22) Filed: Jul. 2, 1999

(51) Int. Cl.[7] .............................. C07G 1/00; C08G 63/91; C08J 3/00; C08J 7/00; C08L 97/00
(52) U.S. Cl. ...................... 524/13; 525/54.4; 530/501; 530/505; 527/400; 527/403
(58) Field of Search .............................. 524/13; 525/54.4; 530/501, 505; 527/400, 403

(56) References Cited

U.S. PATENT DOCUMENTS 5,202,403 * 4/1993 Doering .............................. 527/403
5,866,642 * 2/1999 McVay et al. ........................ 524/74

* cited by examiner

*Primary Examiner*—Nathan M. Nutter
(74) *Attorney, Agent, or Firm*—Mirick, O'Connell, DeMallie & Lougee, LLP

(57) ABSTRACT

This invention features a graft copolymer of lignosulfonates reacted with an unsaturated carbonyl compound and an aldehyde, in two separate reaction steps. The resin can be used as a substitute for a majority of pure urea formaldehyde resin in the manufacture of composite board products. The resin can also be introduced directly into the urea formaldehyde resin production process.

18 Claims, 8 Drawing Sheets

COMPOSITION BOARD BINDING MATERIAL

FIELD OF THE INVENTION

This invention relates to polymeric binders for cellulose and cellulose containing materials and more particularly to fast curing compositions based on a highly functionalized graft polymers of technical lignins together with, or as a component of, standard urea formaldehyde resins, which is especially useful where low formaldehyde emitting applications are involved. The invention is particularly suited for the production of adhesives for particleboard, plywood, fiberboard, and oriented strand board (hereinafter together called "composition board").

BACKGROUND OF THE INVENTION.

The occurrence of lignin as a waste product in the chemical treatment of wood, particularly in the pulp and paper industry, has made it an attractive raw material for adhesives. (*Advanced wood adhesives technology*. A. Pizzi, Marcel Dekker Inc. New York, Basel, Hong Kong. 1994, p. 289)

Because of the economy of using technical lignin instead of standard urea formaldehyde (UF) and phenol formaldehyde (PF) resins, there are reported numerous efforts to extend these resins with technical lignin (*Lignin—Adhesive research for wood composites*. Terry Sellers, Jr. Technical Editor. 1995, Mississippi University).

The first patents dealing with the application of spent sulfite liquor (SSL) as adhesive for paper, wood and other lignocellulosic materials date back to the end of the nineteenth century. At the present time, technical lignins include at least the following:

lignosulfonate, sulfate lignin, hydrolysis lignins, biological lignins, explosive lignins and organosolve lignins.

Lignosulfonate (LS) commonly is used as a generic term for spent sulfite liquor (SSL), lignosulfonate purified from carbohydrates, sulfonated alkali lignin from alkaline pulping processes, e.g. kraft process, and sulfonated hydrolysis lignin, obtained from wood saccharification. For the purposes of this invention LS refers to SSL or LS purified from SSL.

There are two ways to utilize lignosulfonate in adhesives; as the adhesive itself, or mixed with UF or PF resins. As is known in the art, LS is unacceptable for use as an adhesive, because of the extremely long curing time, the high curing temperature needed, and the acidity. Also, LS resins require additional treatment after the compression step. Also, the product has a dark color and low physical and mechanical properties and water resistance.

K. C. Shen and L. Calve, Ammonium-based spent sulfite liquorfor waferboard binder, Adhes. Age, 25–29 (Aug. 1980), and in Canadian Patent No. 2,410,746, disclose making particleboard by condensation reaction of LS. Its properties are inferior to those required for exterior grade particleboard made with PF resin. N. H. Nimz and G. Hitze, The application of spent sutfile liquor as an adhesivefor particleboard, Cellul. Chem. Technol. 14: 371–382 (1980) suggested radical polymerization of LS using hydrogen peroxide. In this case, the formation of new carbon—carbon as well as carbon—oxygen bonds between two radicals is a very fast reaction with low activation energy which needs no external heating or strong mineral acid as a catalyst. However, the results have the drawbacks of a large consumption of hydrogen peroxide (9–10%), and a dark color, which is unacceptable to most users.

The second manner is to use lignosulfonate or modified lignosulfonate in a mixture with UF or PF resins. Conventional techniques for modifying or preprocessing lignin into a water-soluble product exist for use as a binder in various wood processes. One prior art technique involves the methylolation of lignin (e.g. sulfite lignin). For example, as described in Lin, U.S. Pat. No. 4,332,589, lignin is methylolated by treatment with formaldehyde under alkaline conditions at a temperature in the range of about 60 to 90 degrees C. The resultant lignin is then acidified to a pH below 7 and heated to a higher elevated temperature. This technique is further set forth in Schmitt et al, U.S. Pat. No. 5,075,402.

K. Forss and G. Agnetta (U.S. Pat. No. 4,105,606) suggested an adhesive for the manufacture of plywood, fiberboard, and particleboard, containing the combination of phenol formaldehyde resin, and lignin derivatives such as lignosulfonates or alkali lignins. According to the invention, a minimum of 65% by weight of lignosulfonates and a minimum 40% of the alkali lignins have relative molecular weights in excess of that of Glucagon, (3483 Daltons).

In Zaslavsky's U.S. Pat. No. 4,276,077, the reagents used are graft polymers obtained from crude lignosulfonate, and a monomer selected from the group consisting of vinyl cyanide (acrylonitrile), vinyl acetate, hydrolyzed vinyl acetate and acrylamide or combinations thereof, at a pH range of between 2 and 6 in the presence of an initiator.

Lin suggested in U.S. Pat. No. 4,332,589 a two-stage treatment of lignin, the first stage carried out with formaldehyde, and the second stage with air or oxygen to increase the molecular weight. The lignin is first treated with from 0.5 to 3.5 moles of formaldehyde per 1000 grams of lignin at a pH between 10.5 and 11.5 and a temperature from 50 degrees C. to 80 degrees C. for from 3 to 24 hours to form a lignin formaldehyde adduct, preferably with minimum crosslinking of lignin. Then the thus formed lignin formaldehyde adduct is oxidized at a temperature of from 25 degrees C. to 80 degrees C. with air or molecular oxygen for from 2 to 24 hours.

U.S. Pat. No. 4,546,173 describes a method of methylolation of sulfonated lignin suitable for use as dispersants and adhesives wherein sulfonated lignins are post sulfonation crosslinked with a crosslinking agent of the aldehyde, epoxide or polyhalide type at pH range of between about 6.1 to 9 to selectively crosslink the low molecular weight lignins to provide improved heat stability and dispersibility of the sulfonated lignins in dye compositions.

Hume et al suggested in U.S. Pat. No. 4,564,649 an aqueous adhesive possessing sufficient adhesion, tack, open time, thermal stability, biological stability, dimensional stability, flexibility, and adhesion contained in an aqueous base of polyvinyl alcohol and lignosulfonate wherein there are about 1 to 8 parts of the lignosulfonate per each part of the polyvinyl alcohol.

Thus in principle it has been shown that technical lignin, in particular SSL or lignosulfonate, can be used to replace aminoplast or phenol formaldehyde resin in quantities of up to 10–15% of the resin without unacceptably affecting the resin quality. But as the quantity of lignin derivatives increases, there is a concurrent increase in the curing time, and temperature, and a decrease in pH, which can cause corrosion of the composition board press plates, an unacceptable drawback. Also, there is a tendency to affect the product's mechanical properties, and increase the emission of free formaldehyde from the urea—formaldehyde resin.

SUMMARY OF THE INVENTION

The present invention relates to a novel and improved lignin—UF resin composition, its use and to a method for producing such composition. The invention is a non-toxic stable composition including in solution about 95–100% parts methylolated-lignin-urea formaldehyde resin, which contain 10–90% graft copolymer of lignin.

The methods of obtaining the inventive graft copolymer of lignosulfonate contemplate the use of one or more unsaturated monomers containing carbonyl groups, particularly aldehyde groups, and also amides, nitrils, carboxylic, hydroxyl, acetic, amino and other functional groups. The examples include the use of several unsaturated aldehydes: acrolein (2-Propenal), crotonaldehyde (2-Butenal), and citral (a terpene).

Most of the experiments used ammonium lignosulfonate as the starting LS material, but sodium lignosulfonate was also used, and created an adhesive with better properties. Calcium lignosulfonate and magnesium lignosulfonate, as well as lignosulfonate with mixed bases, can also be used.

For obtaining a water-soluble resin within this invention, a sulfate lignin or ALCELL lignin was used, along with acrylic acid. For this reaction, good mixing of the lignin and acrylic acid is important because the reaction takes place only in solution. This requires the use of either an alkaline medium for the reaction, or an organic solvent in which the lignin can be dissolved.

The graft copolymerisation of the unsaturated aldehydes with the lignosulfonate can be carried out by different radical initiated reactions, for example using high temperature, radioactive metals, diazo compounds, different kinds of peroxides (in particular hydrogen peroxide) and valence transition metals. In most examples hydrogen peroxide and chloride of iron (II) were used. The process is typically carried out at a temperature of about 15–35 degrees C. (59–95 degrees F.), for about 1–4 hours, at a pH of about 4–11.

Using different quantities of iron salt and hydrogen peroxide can control the velocity of reaction. The extent of the reaction, and the direction of copolymerisation (i.e., the reactivity positions of the phenylpropan units) can be controlled through the quantity of the aldehyde charge, the reaction time and temperature. The total quantity of aldehyde is related to the copolymer reactivity. As a rule, several percent aldehyde was used.

When 10% acrolein was used, the product after methylolation had a very high viscosity and very short lifetime. The use of less than 0.2% acrolein was insufficient. It is believed that this unexpected and unpredictable high reactivity of graft copolymer of lignosulfonate is caused by the bonding of the aldehyde group with the aromatic units of the lignosulfonates, which allows the aldehyde group to react more easily with other reactive groups, both of lignosulfoiiate aind of imolccules of the composite rcsii (e. g UF-resin).

Due to the relatively high cost of the unsaturated aldehyde, methylol groups were introduced by reaction of the lignosulfonate (either before or after the reaction with the unsaturated carbonyl compound) with an aldehyde (typically saturated), particularly formaldehyde, at 1–10% by weight of lignosulfonate, at a pH of 9–11, a temperature of 75–100 degrees C., for from 5–75 min. The temperature was then decreased to about 30 degrees C., the pH to about 7–10.5, to obtain the end product. The surplus water and volatile organic substances, particularly formaldehyde, were then removed by rotary vacuum evaporator, to a solids content of about 52–60%, and the product was held in storage before using, as necessary. The solids content can be adjusted as desired, to achieve a desired moisture content in the composite board product. In fact, the inventive resin can be dried to a powder before use, and can be used partially as a powder, and partially as a liquid, to achieve a desired result.

It is possible to produce the inventive resin by carrying out the reactions in the opposite order, in which the first reaction with the lignosulfonate is the methylolation, and the second reaction is with the unsaturated aldehyde. In this case there is better control of the second reaction because it is carried out at low temperature.

The inventive resin can be used by itself, or mixed with synthetic or natural resin, or can be reacted with an intermediate product of urea and formaldehyde in the UF-production reaction. Surprisingly, when the inventive graft copolymer of lignosulfonate is mixed with the pure synthetic UF resin, the mixture has a very low viscosity closer to that of the pure UF resin than to that of the pure graft copolymer (see FIG. 1). This allows the inventive resin to be sprayed, as required in the composite board production processes, in spite of the high viscosity of the pure graft co-polymer of lignosulfonate (about 5,000–10,000 cp.sec.).

Also, the resin curing time is less than that of the pure graft copolymer because the copolymer aldehyde group reacts with the amide groups of the UF resin much more readily than do the methylol groups which are contained in lignosulfonate after its reaction only with formaldehyde.

In the typical three layer composition board made with standard UF resin (e.g., particleboard), the core layer includes about 6.5% resin, and the face layers about 9.5% resin. It has been found that up to about 60% of the resin in the core can be substituted with the inventive resin, and up to about 100% of the resin in the face layers can be substituted with the inventive resin, while maintaining required board properties.

This invention features in one embodiment a thermosetting resin composition board binding material, comprising the reaction product of lignosulfonate, an unsaturated carbonyl compound, and an aldehyde. The carbonyl compound may be an alkene aldehyde, which may be acrolein, which may be present in about 0.1–8%, by weight of the starting material. Alternatively, the alkene aldehyde may be crotonaldehyde, which may be present in about 0.1–10%, by weight of the starting material. In another alternative, the alkene aldehyde may be the terpene citral. The aldehyde is preferably formaldehyde.

In one embodiment, the lignosulfonate is present in an amount of about 70–95 percent by weight, the carbonyl compound is present in an amount of about 0.1–10 percent by weight, and the aldehyde is present in an amount of about 5–20 percent by weight.

The composition board binding material may be produced by a first reaction of the lignosulfonate with one of the carbonyl compound and the aldehyde, to produce a first reaction product, followed by a second reaction of the first reaction product with the other of the carbonyl compound and the aldehyde. In this case, the aldehyde may be formaldehyde, and the reaction involving formaldehyde may take place at a basic pH and elevated temperature. The reaction involving the carbonyl compound is preferably a radical initiated reaction, which may use an initiator selected from the group of initiators consisting of hydrogen peroxide—Fe(II), an azo compound, an organic peroxide, and ammonium persulfate. The basic pH may be about 8–10.5, and the temperature about 60–99 degrees C.

The composition board binding material may further comprise the product of reaction of the reaction product with a urea—formaldehyde resin intermediate product, in which case the reaction product may be present in an amount of up to about 80 percent by weight of the final product.

This invention also features a composition board binding material comprising the reaction product described above, together with urea formaldehyde copolymer. In this case, the final product may be present in an amount up to about 100 percent by weight of the adhesive.

BRIEF DESCRIPTION OF THE DRAWINGS

Other objects, features and advantages will occur to those skilled in the art from the following description of the preferred embodiment, and the accompanying drawings, in which.

DESCRIPTION OF THE PREFERRED EMBODIMENTS

Figure 1:
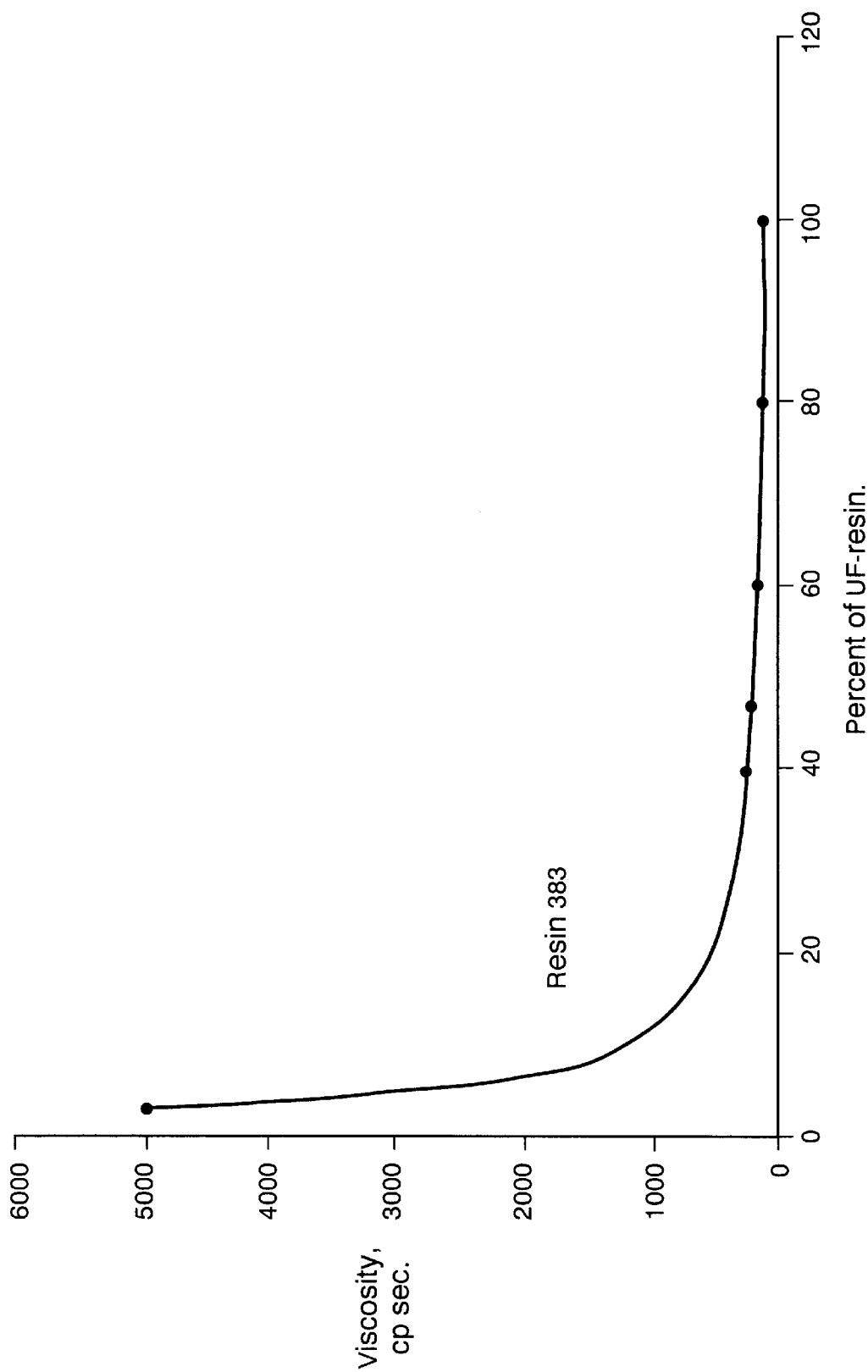
FIG. 1 is a graph showing the effect of the addition of urea formaldehyde resin on the viscosity of the inventive resin (resin number 383)

The inventive graft copolymer of this invention is made by reacting a lignosulfonate with an unsaturated carbonyl compound, and an aldehyde, in two separate steps. These steps can take place in either order. It has also been found that the inventive graft copolymer can be introduced in quantities of up to about 80% in the production of urea formaldehyde resins, having the same result as when the inventive product is substituted for a portion of the UF resin previously produced. The resulting resin product can be used as a substitute for up to about 100% of a pure UF resin, in the production of composite board products, without unacceptably affecting the board production process, or the resulting physical and mechanical board properties.

In the examples which follow, the ammonium lignosulfonate used had a solids content of about 50% by weight, a pH of about 5, a specific gravity of about 1.22, and viscosity of about 1000–1200 cps at room temperature. The sodium lignosulfonate had a solids content of about 48%, a pH of about 7.5, and a viscosity of about 1000 cps. Both starting materials were obtained from Tembec Chemical Products Company of Temiscaming, PQ, Canada, and some of the sodium lignosulfonate was obtained from the Georgia Pacific Company, Decatur, Ga.

The following examples and tables describe a number of experiments performed in the production and use of the inventive copolymer resin of this invention. The tables include data for resins which are not specifically described in an example, but any differences between the examples and the table data is readily determined from the tables themselves. Any resin produced by a different process is given a different resin number in the examples, tables, and drawings. The drawings are also exemplary, not exhaustive, in that not all of the data from the examples and tables is found in a drawing.

In the following examples, when amounts are expressed as percentages, such is determined based. on the oven dry weight of the starting lignosulfonate material, unless otherwise expressed.

EXAMPLES

Example 1

(Resin number 403)

240 g of ammonium lignosulfonate from ethyl alcohol fermentation (51.5% solids, pH of 4.3 at 25 degrees C., viscosity of 1225 cps at 25 degrees C., and free nitrogen of 0.13% based on solids) were introduced into a reactor (three neck flask provided with stirrer, thermometer and condenser). 10 g of a 50% NaOH solution, and several crystals $FeCl_2$ were added and dissolved in the liquid over 15 min. at room temperature. Then 2.5 g (2.1 weight %) acrolein (2-Propenal) was added and mixed for 10 min., still at room temperature. After that ~1 ml 30% hydrogen peroxide was added and an exothermic reaction was observed; the temperature increased by about 5–10 degrees C. The mixture was kept at 30 degrees C. for 3 hours, with stirring. During this time, about 0.5 ml hydrogen peroxide was added twice over the course of the first hour. Then 20 g of the 50% NaOH solution was added.

A strong exothermic reaction was observed, in which the temperature increased to about 50–60 degrees C. Using a heating mantle, the temperature was increased to 60–65 degrees C., and then 24 ml of 37% formaldehyde was added while maintaining strong stirring. The mixture was then rapidly heated to about 80 degrees C., and maintained with reflux for 5 min. at that temperature. The mixture was then cooled to about 35 degrees C., and the pH was adjusted with 50% sulfuric acid to 6.8–7.3. See table 1 for a summary of the reaction parameters.

Figure 2:
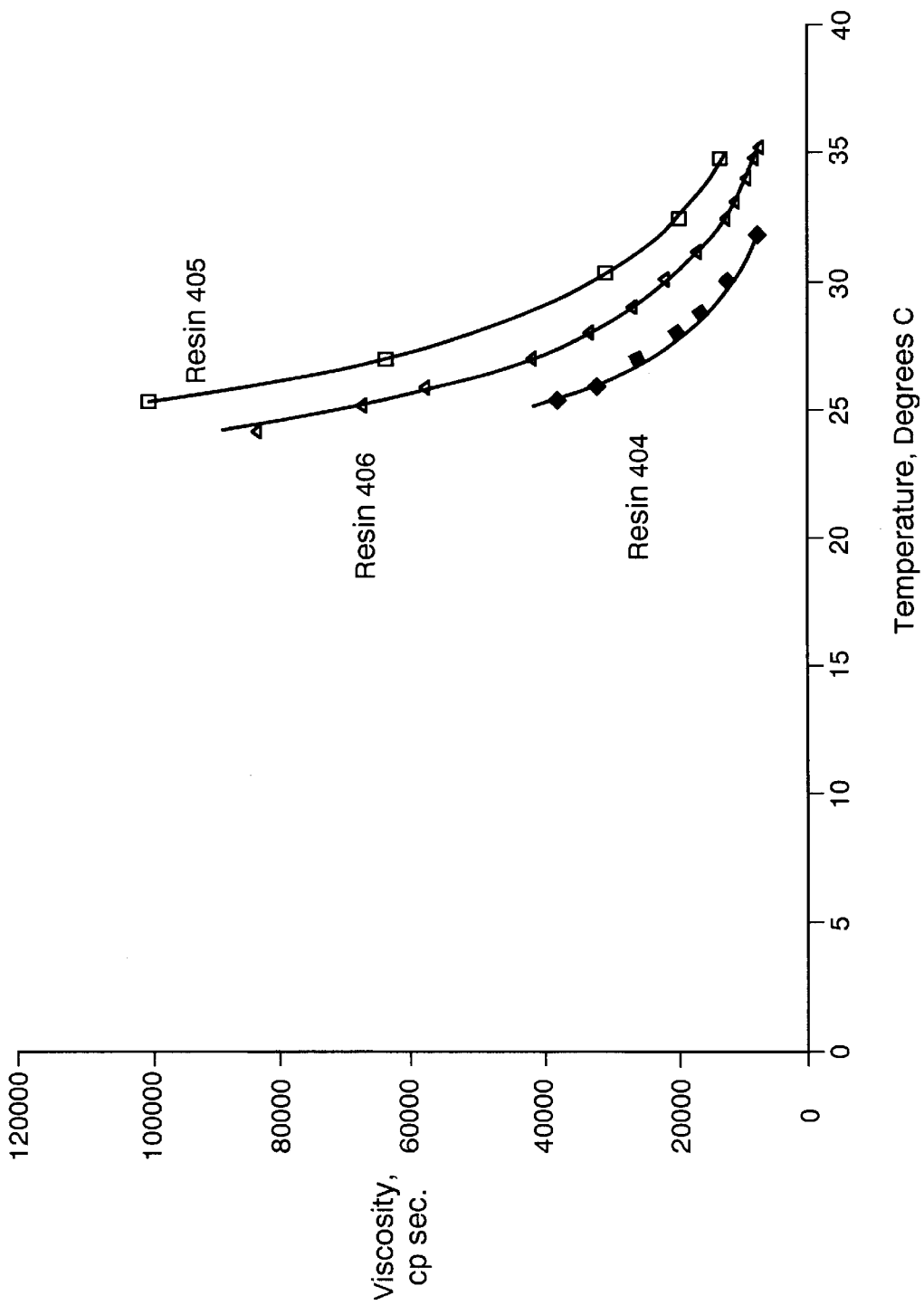
FIG. 2 is a graph showing the influence of temperature on the viscosity of the inventive resin (resins 404, 405, and 406)
Figure 3:
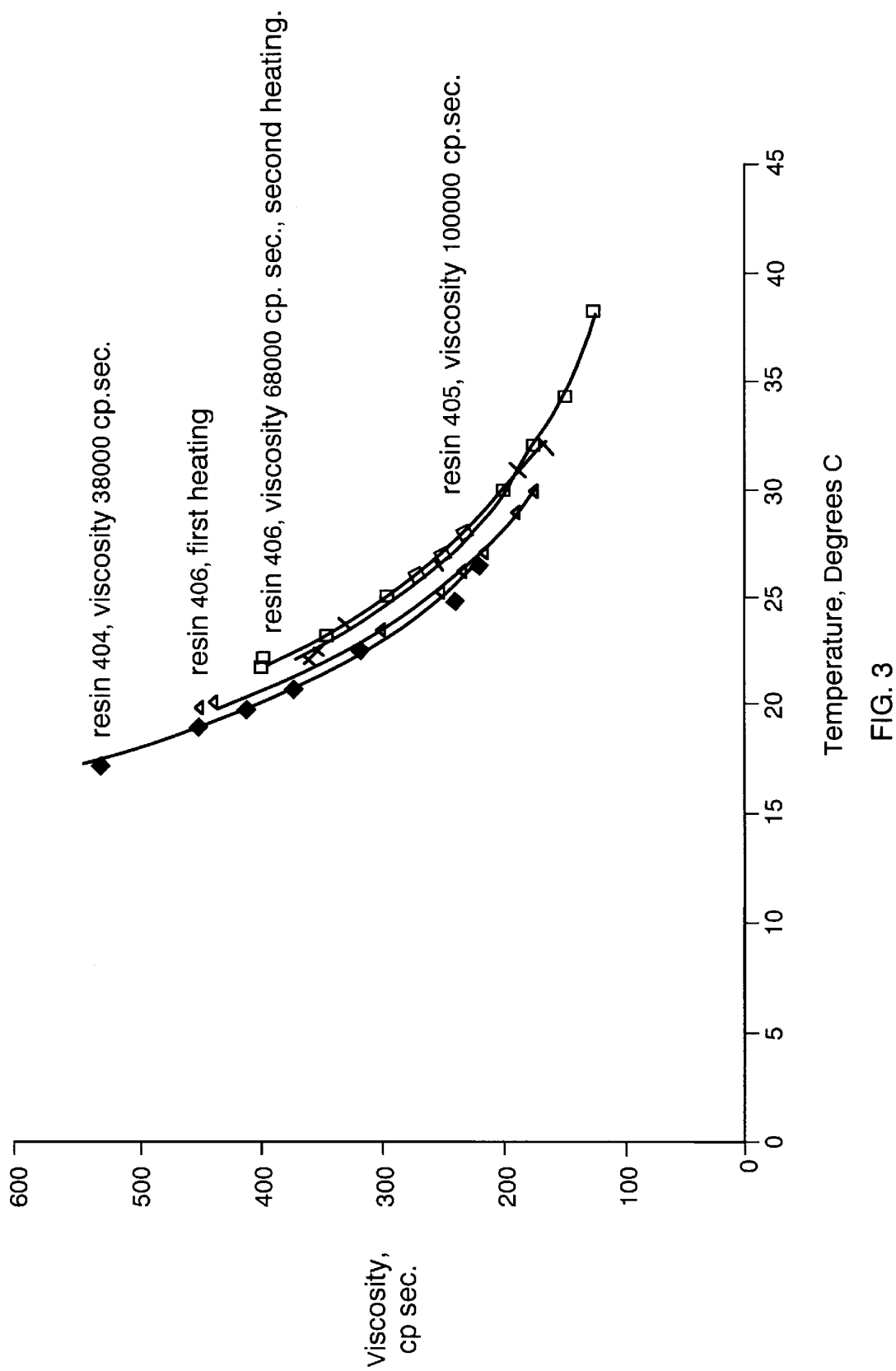
FIG. 3 is a graph showing the influence of temperature on the viscosity of 50:50 mixtures of the inventive resin with pure UF resin (resins 404, 405, and 406)
Figure 4:
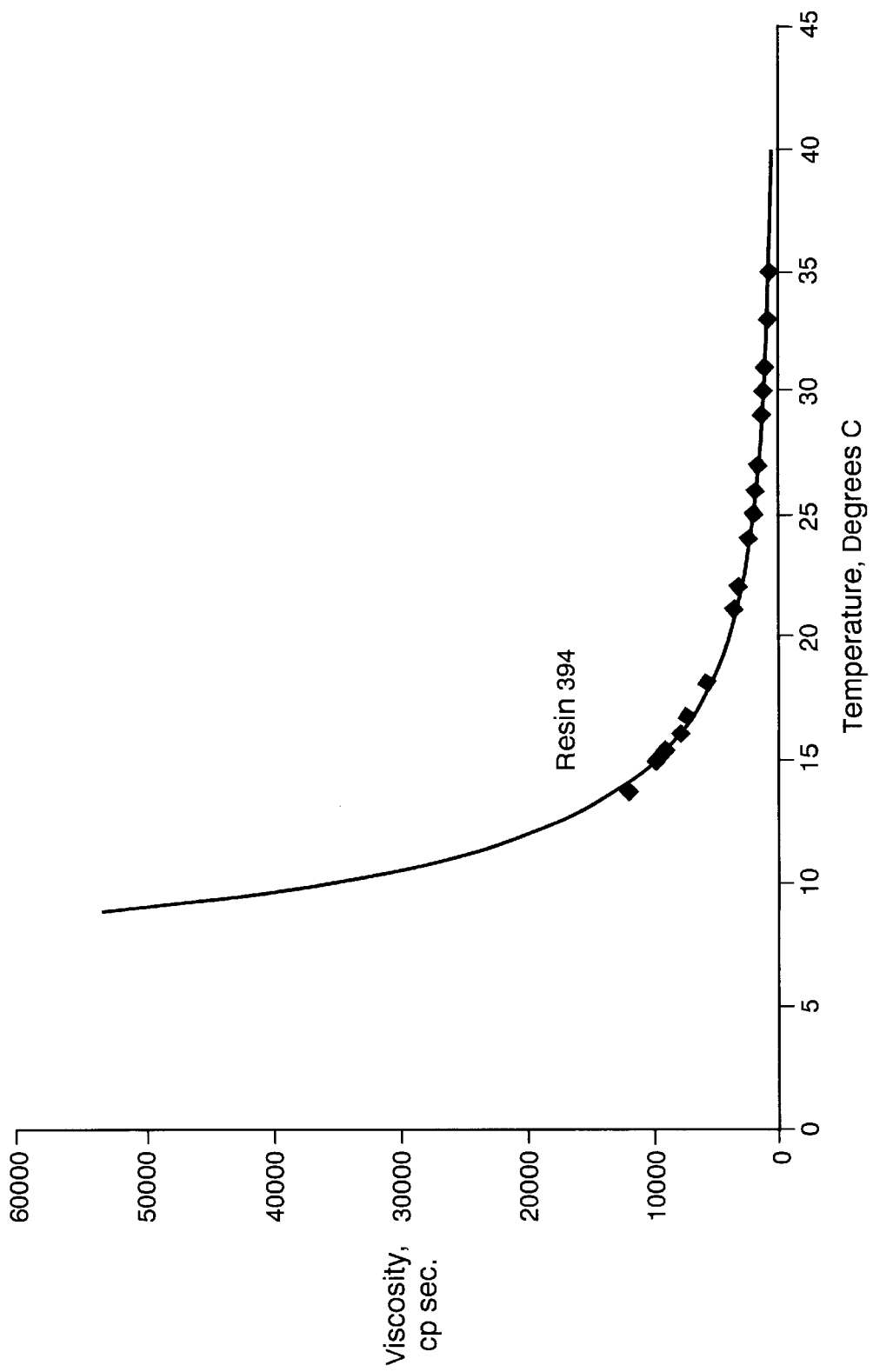
FIG. 4 is a graph showing the influence of temperature on the viscosity of an 80:20 mixture of the inventive resins and UF resin, respectively (resin number 394)
Figure 5:
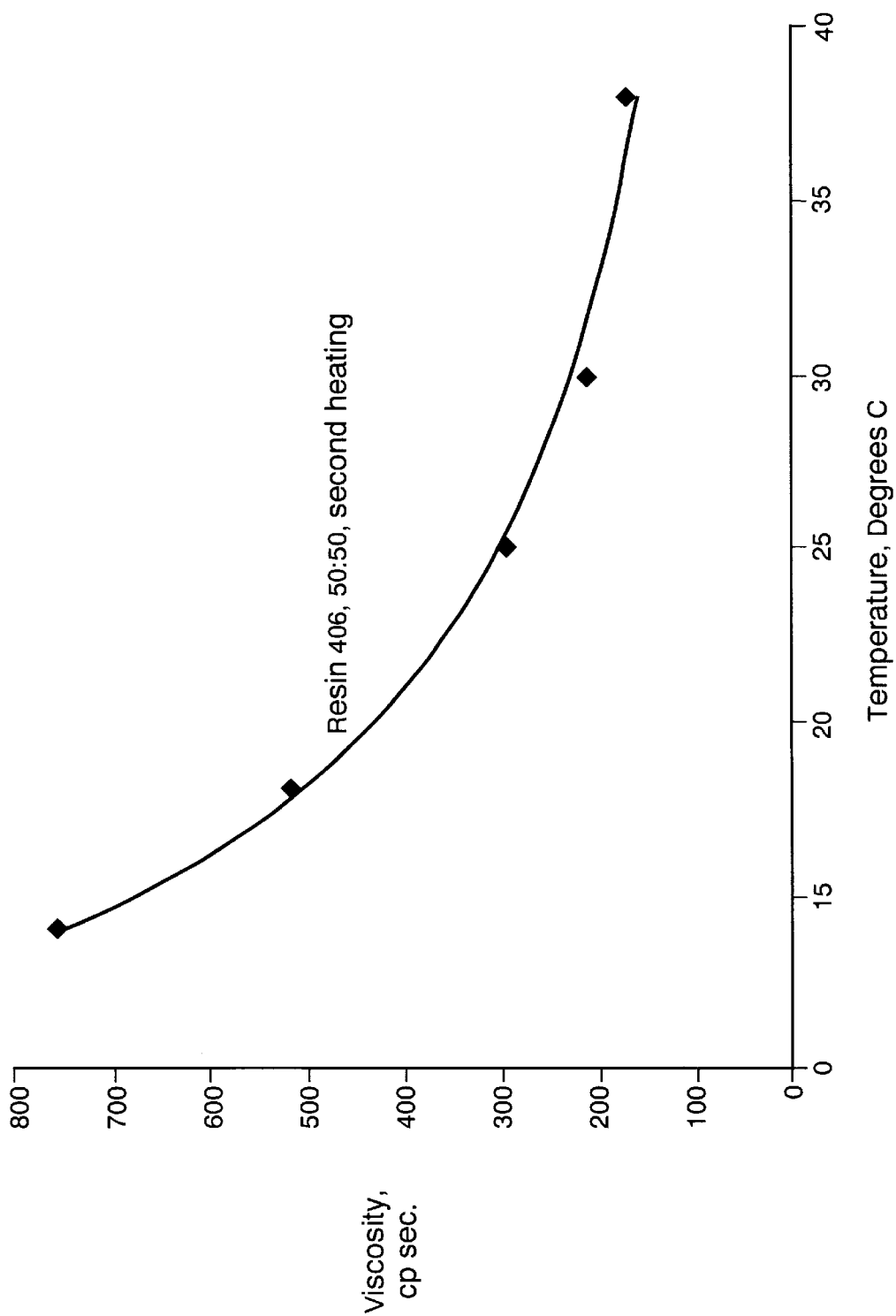
FIG. 5 is a graph showing the influence of temperature on the viscosity of a 50:50 mixture of the inventive resin with pure UF resin, respectively (resin number 406)

The reaction product was a brown solution which was evaporated under vacuum to a solids concentration of 50–53%. The end product was liquid with a viscosity at 25 degrees C. of 2,000–8,000 cp. sec. The viscosity was strongly dependent on the oven dry solids concentration and on temperature (see, e.g., FIG. 2), which establishes the existence of a secondary reversible interaction (intermolecular interaction by means of hydrogen bonding). This is an important quality for use as a composition board binder product, because the adhesive must have a viscosity which is low enough (typically no more than about 600 cps) to be sprayed onto wood particles in the composition board manufacturing process.

The product was tested alone and as a mixture with standard composition board UF resin in one and three-layer particleboard. The blending of particles with the resin was carried out in a bucket by spraying at ambient temperature. The blended particles were formed into a mat which was pressed with heated plates at a pressure of about 35 kg/cm$^2$ and temperature of about 160–190 degrees C. The density of the particleboard was 0.65–0.8 g/cm$^3$.

The curing time for the pure resin product for a one layer particleboard of 20-mm thickness was 7 min., or 21 sec/mm thickness. The curing time for the mixture of the product and Urea-Formaldehyde (UF) resin was about 9–12 sec/mm of thickness. The resulting particleboard products were tested according to the standard ASTM method 1037–98. These data are presented in table 2.

The resin can replace 40–70% of the standard UF resin in the face layer, and 10–20% in the core without unacceptably affecting the physical and mechanical properties, or increasing the curing time. The test results and paraneters of reaction for all of the samples are shown in tables 1–12 below.

Example 2
(Resin number 411)

The resin was synthesized under the same conditions as in example 1, but with the steps reversed, i.e., the methylolation (reaction with formaldehyde) was carried out first, and after that the resulting reaction product underwent the radical reaction with the unsaturated aldehyde acrolein. The results are shown in tables 1 and 2.

Example 3
(Resin number 401)

The resin was synthesized under the same conditions as in example 1, but the quantity of acrolein was decreased from 2.5 g to 0.42 g. The product had properties very close to methylolated lignosulfonate not reacted with acrolein. In another case (not shown in the tables), 12 g acrolein was used, but the resulting resin had a very short useful lifetime, and consequently could not be used in the standard particleboard production processes. The results are shown in tables 3 and 4.

Example 4
(Resin number 381)

The resin was synthesized under the same conditions as in example 1, but the charge of formaldehyde was doubled to 16%, and the acrolein was added without the preliminary addition of the 5 g of alkali. The results are shown in tables 3 and 4.

Example 5
(Resin numbers 388, 390, 409, 414, and 390-1)

The resins were synthesized under the same conditions as in example 1, but the quantity of formaldehyde was changed to 0.1%; 5%; 8%; and 16% of the weight of lignosulfonate. The results are shown in tables 9 and 10.

Example 6
(Resin numbers 395, 397, 398, and 398-2)

The resins were synthesized under the same conditions as in example 1, but acrolein was replaced by crotonaldehyde in the amounts of 1.5%, 3.0%, 6.0%, and 10% of the weight of lignosulfonate. The results are shown in tables 7 and 8.

Example 7
(Resin numbers 400 and 413)

The resins were synthesized under the same conditions as in the example 1, but acrolein was replaced by citral in the amount of 4.4% of the weight of lignosulfonate. The results are shown in tables 7 and 8.

Example 8
(Resin number 399)

The resin was synthesized under the same conditions as in example 1, but acrolein was replaced by acrylamide in the amount of 4.15% of the weight of lignosulfonate. The results are shown in tables 7 and 8.

Example 9
(Resin number 400-1)

The resin was synthesized under the same conditions as in example 1, but acrolein was replaced by a mixture of acrylamide and crotonaldehyde in the amounts of 1.25% and 2.15% of the weight of lignosulfonate, respectively. The results are shown in tables 7and8.

Example 10
(Resin numbers 388, 390, 390-1, 409, 414, and 447-1)

The resins were synthesized under the same conditions as in example 1, but instead of ammonium lignosulfonate, sodium lignosulfonate was used; 256 g of sodium lignosulfonate from Tembec (from ethyl alcohol fermentation), having 48.3% solids, a pH of 7.57 at 25 degrees C., a viscosity of 1009 cps at 25 degrees C., and a free nitrogen content (based on. solid) of 0.13%. In this case the amount of NaOH used to increase the pH was much lower, about three times less. The results of the experiments are shown in tables 9 and 10.

Example 11
(Resin number 327-1)

The resin was synthesized as described in example 1, but the redox-system was replaced by ammonium persulfate, and the reaction temperature was increased from 30 to 80 ° C. The resin was used as an adhesive. The results are shown in tables 9 and 10.

Example 12
(Resin numbers 228-1 and 228-2)

The resins were synthesized under the same conditions as in example 1, but the redox -system (hydrogen peroxide—Fe (II)) was replaced with azo initiators VA-80, and VA-50 (Wako Chemical USA), and the temperature was increased from 26° C. to 80° C., and the reaction was allowed to proceed for 120 min. The resulting resin was used as adhesive. The results are shown in tables 9 and 10.

The following Examples 13–20 describe the use of the LS-derived resins (such as described in Examples 1–12 above) as reaction ingredients in the standard ureaformaldehyde production process, illustrating a second manner in which the LS-derived resin can be used, to create an additional novel inventive resin for composite board production.

Example 13
(Resin number 447)

To 200 gr. of 37% formaldehyde solution was added sufficient 20% NaOH to raise the pH to from 8.3 to 8.5. 78 gr. of urea solids were added, and the temperature was raised in 60 min. from ambient to 85 degrees C., while maintaining the pH at 6.5 to 7.0.

The pH was changed to 4.9 to 5.2 by the addition of 30% formic acid, and the temperature was raised to 90–95 degrees C. and maintained at 95 degrees C. for 80 min. while maintaining the pH at approximately 5.2 to 5.3. The pH was then adjusted to 6.5 to 6.8, and 30 gr. urea solids were added, and the temperature maintained at 90 degrees C. for another 80 min.

The pH was then adjusted to 7.5 to 7.6, and after cooling to 50 degrees C., 217 gr. of LS-derived resin of the invention (resin number 447-1 (example 10)(at 47% solids)), was added. The temperature was maintained at 45–50 degrees C., and the pH maintained at 7.5 to 7.8, for another 30 min.

The resin was then cooled to 50–55 degrees C. in 30 min., and was vacuum distilled. The resin after distillation was cooled to 30 degrees C. in 30 min. while maintaining the pH at 8.0, and held for a minimum of 12 hr. in storage.

The resulting resin had 51% solids, a pH of 8.0, a density of 1.3 g/cc, a viscosity at 25 degrees C. of 127 cps, and a gel time of 90 sec.

The resins were tested alone and as a mixture with standard UF resin in both one and three layer particleboard (see table 13).

Tables 11 and 12 show resins produced in this manner, in which the LS-derived resin was introduced into the UF resin production process, as described in this document. The viscosity of resin number 450 (having 52% solids) was 615 cps, and that of resin number 489 (80% LS-derived resin) was 1160 cps.

Example 14
(Resin number 485).

Resin was synthesized under the same conditions as in example 13, but the time of reaction after addition of the LS-derived resin was 160 min., at a temperature of 90–95 degrees C. and pH of 7.2–7.5. See tables 11 and 12.

Example 15
(Resin number 448).

Resin was synthesized under the same conditions as in example 13, but the LS-derived resin was obtained according to example 2 (i.e., reverse reaction order). The data are shown in table 13.

Example 16
(Resin number 434)

Resin was synthesized under the same conditions as in example 13, but instead of sodium lignosulfonate, calcium lignosulfonate was used to make the LS-derived resin, according to example 10. The data are shown in tables 11 and 12.

Example 17
(Resin number 469)

Resin was synthesized under the same conditions as in example 13, but the LS-derived resin was obtained by reaction only with acrolein, without the second stage-reaction with formaldehyde. See tables 11 and 12.

Example 18
(Resin number 478)

Resins were synthesized under the same conditions as in examples 13 and 15, but the reaction time of the LS-derived resin and the UF resin intermediate was increased to 120 min. The data are shown in tables 11 and 12.

Example 19
(Resin number 487)

Resins were synthesized under the same conditions as in the examples 13 and 15, but the pH of the reaction was decreased to 6.0–6.5. The data are shown in tables 11 and 12.

Example 20
(Resin number 470)

Resins were synthesized under the same conditions as in example 17, but after the reaction with acrolein, the reaction product was treated with urea at a temperature of 80–90 degrees C., a pH of 6.8–7.2, for 30–60 min. The data are shown in tables 11 and 12.

Example 21
(Resins 404, 405, 406)

Resin 404 was synthesized as described in Example 1. After synthesis, the resin solution was adjusted to pH 5.8 using 50% sulfuric acid and heated at 65–70 degrees C. for 2 hours. This resulted in a viscosity increase to 38,000 cps.

Resin 405 was synthesized from resin 404 by heating at 65–70 degrees C. for an additional 2 hours. This resulted in a viscosity increase to 100,000 cps.

Resin 406 was synthesized as described for resin 404, except the period of heating 3½ hours at 65–70 degrees C. The resulting resin had a viscosity of 68,000 cps.

TABLE 1

Conditions of inventive graft copolymer resin synthesis.

| Trial No/ No resin | Charge of formaldehyde, %. | Temperature, ° C. | Time, min. | PH. | Charge of unsaturated aldehyde, %. | Temperature, ° C. | Time, min. | pH. |
|---|---|---|---|---|---|---|---|---|
| 1/392 | 8 | 80 | 5 | 9.5 | Acr. 2.1 | 30 | 120 | 8.5 |
| 2/403 | 8 | 80 | 5 | 9.5 | Acr. 2.1 | 30 | 180 | 8.5 |
| 3/411* | 8 | 80 | 5 | 9.5 | Acr. 2.1 | 30 | 180 | 9.6 |
| 4/410** | 8 | 80 | 5 | 9.5 | Acr. 2.1 | 25 | 180 | 9.0 |
| 5/394-1 | 8 | 60 | 360 | 9.5 | Acr. 2.1 | 30 | 120 | 8.5 |
| 6/394-2 | 8 | 60 | 150 | 9.5 | Acr. 2.1 | 30 | 120 | 8.5 |

Notes:
Acr. = acrolein.
*resin synthesized in reverse order.
**Mixture of lignosulfonate 85% and sulfate lignin 15%.

TABLE 2

Conditions of panels manufacturing and their properties.

| Trial No | Resin No | Panel No | Pressing Temperature ° C. | Pressing time, min. | LS resin, Face/Core % | IB, kg/cm² | Number of layers |
|---|---|---|---|---|---|---|---|
| 1 | 392 | 70 | 170 | 3 | 20 | Destroyed | 1 |
|   |   | 70 | 170 | 4 | 30 | 9.4 | 1 |
|   |   | 70 | 180 | 3 | 30 | 5.6 | 1 |

TABLE 2-continued

Conditions of panels manufacturing and their properties.

| Trial No | Resin No | Panel No | Pressing Temperature °C | Pressing time, min. | LS resin, Face/Core % | IB, kg/cm² | Number of layers |
|---|---|---|---|---|---|---|---|
| 2 | 403 | 65 | 180 | 3 | 70/10 | 8.8 | 3 |
|  |  | 65 | 180 | 3.5 | 70/10 | 8.4 | 3 |
|  |  | 67 | 190 | 3 | 70/10 | 7.2 | 3 |
|  |  | 67 | 190 | 3.5 | 70/10 | 8.1 | 3 |
| 3 | 411* | 43 | 180 | 3.5 | 40/30 | 6.1 | 3 |
| 4 | 410** | 44 | 180 | 3.5 | 40/30 | 4.8 | 3 |
| 5 | 394-1 | High viscosity. Not possible to spray |  |  |  |  |  |
| 6 | 394-2 | 44-1 | 180 | 3 | 20/0 | 9.0 | 3 |

Notes:
411* and 410** see notes to table 3.
Density of all panels was about 0.7 g/cm³
LS resin is the inventive resin. The percentage indicates the percentage of total standard UF resin content for the layer which was substituted by the inventive resin.
IB = internal bond.

TABLE 3

Conditions of inventive graft copolymer resin synthesis.

| Trial No/ No resin | Charge of formaldehyde, %. | Temperature, °C. | Time, min. | PH. | Charge of unsaturated aldehyde, %. | Temperature, °C. | Time, min. | pH. |
|---|---|---|---|---|---|---|---|---|
| 1/381 | 16 | 80 | 5 | 4.0 | Acr. 4.2 | 32 | 60 | 5 |
| 2/383 | — | — | — | — | Acr. 8.4 | 31 | 120 | 8.0 |
| 3/384 | — | — | — | — | Acr. 4.2 | 32 | 120 | 8.0 |
| 4/385 | 16 | 80 | 5 | 9.5 | Acr. 2.1 | 32 | 120 | 8.0 |
| 5/386 | — | — | — | — | Acr. 2.1 | 33 | 120 | 6.0 |
| 6/387 | — | — | — | — | Acr. 4.2 | 30 | 120 | 8.0 |
| 7/401 | 8 | 80 | 5 | 9.5 | Acr. 0.3 | 31 | 120 | 8.0 |

Notes:
Acr. = acrolein.
*Resin synthesized in the reverse order
**Mixture of lignosulfonate 85% and sulfate lignin 15%.

TABLE 4

Conditions of panels manufacturing and their properties.

| Trial No | Resin No | Panel No. | Pressing Temperature °C | Pressing Time, min. | Ls resin Face/Core % | IB, kg/cm² | Number of layers |
|---|---|---|---|---|---|---|---|
| 1 | 381 | 105 | 170 | 3 | 20 | 3.8 | 1 |
|  |  |  | 170 | 5 | 30 | 5.4 | 1 |
| 2 | 383 | 96 | 170 | 3 | 10 | 7.8 | 1 |
|  |  | 98 | 170 | 3 | 20 | 6.8 | 1 |
|  |  | 104 | 170 | 3 | 30 | 3.2 | 1 |
| 3 | 384 | 132 | 170 | 5 | 20 | 9.6 | 1 |
|  |  | 134 | 170 | 5 | 30 | 6.8 | 1 |
| 4 | 385 | 113 | 170 | 3 | 20 | 6.6 | 1 |
|  |  | 116 | 170 | 5 | 30 | 7.3 | 1 |
| 5 | 386 | 122 | 170 | 5 | 20 | 8.0 | 1 |
|  |  | 124 | 170 | 5 | 30 | 6.2 | 1 |
| 6 | 387 | 118 | 170 | 5 | 20 | 9.2 | 1 |
|  |  | 120 | 170 | 5 | 30 | 6.0 | 1 |
| 7 | 401 | 120B | 170 | 3 | 20 | 3.0 | 1 |

Notes:
Density of all panels was about 0.7 g/cm³.

TABLE 5

Conditions of inventive graft copolymer resin synthesis.

| Trial No/ No resin | Charge of formaldehyde, %. | Temperature, °C. | Time, min. | PH. | Charge of unsaturated aldehyde, %. | Temperature, °C. | Time, min. | pH. |
|---|---|---|---|---|---|---|---|---|
| 1/377 | 16 | 80 | 5 | 4.5 | — | — | — | — |
| 2/378 | 16 | 80 | 120 | 4.5 | — | — | — | — |
| 3/380 | 16 | 80 | 5 | 4.5 | — | — | — | — |
| 4/382 | 16 | 80 | 5 | 9.5 | — | — | — | — |
| 5/412 | 8 | 80 | 5 | 9.5 | — | — | — | — |

TABLE 6

Conditions of panels manufacturing and their properties.

| Trial No | Resin No | Panel No. | Pressing Temperature °C. | Pressing Time, min. | Ls resin Face/Core % | IB, kg/cm² | Number of layers |
|---|---|---|---|---|---|---|---|
| 1 | 377 | 72 | 180 | 5 | 50 | 2.6 | 1 |
| 2 | 378 | 73 | 180 | 5 | 50 | 5.4 | 1 |
| 3 | 380 | 90 | 170 | 5 | 20 | 7.0 | 1 |
|   |   | 91 | 170 | 3 | 20 | 5.2 | 1 |
| 4 | 382 | 126 | 170 | 5 | 20 | 11.8 | 1 |
|   |   | 127 | 170 | 3 | 20/0 | 5.4 | 3 |
|   |   | 128 | 170 | 5 | 30/0 | 8.6 | 3 |
|   |   | 129 | 180 | 3 | 50/0 | 8.0 | 3 |
| 5 | 412 | 54 | 180 | 3.5 | 40/30 | 5.6 | 3 |
| 6 | 412-1 | 54-1 | 180 | 3.0 | 70/10 | 4.8 | 3 |

Notice:
Density of panel No 72 was 0.8 g/cm³.
Density of the others was about 0.7 g/cm³.

TABLE 7

Conditions of inventive graft copolymer resin synthesis.

| Trial No/ No resin | Charge of formaldehyde, %. | Temperature, °C. | Time, min. | PH. | Charge of unsaturated aldehyde, %. | Temperature, °C. | Time, min. | pH. |
|---|---|---|---|---|---|---|---|---|
| 1/395 | 8 | 80 | 5 | 9.5 | Croton, 3 | 30 | 180 | 5.5 |
| 2/397 | 8 | 80 | 5 | 9.5 | Croton, 1.5 | 30 | 180 | 5.5 |
| 3/398 | 8 | 80 | 5 | 9.5 | Croton, 6.0 | 30 | 180 | 5.5 |
| 4/398-2 | 8 | 80 | 5 | 9.5 | Croton, 10.0 | 30 | 180 | 5.5 |
| 5/399 | 8 | 80 | 5 | 9.5 | Acrylamide 4.15 | 30 | 180 | 5.5 |
| 6/400 | 8 | 80 | 5 | 9.5 | Citral, 4.4 | 30 | 180 | 5.5 |
| 7/413 | 8 | 80 | 5 | 9.5 | Citral, 4.4 | 40–50 | 120 | 9.1 |
| 8/400-1 | 8 | 80 | 5 | 9.5 | Croton, 2.15 + acrylamide 1.25 | 30 | 180 | 5.5 |

TABLE 8

Conditions of panels manufacturing and their properties.

| Trial No | Resin No | Panel No. | Pressing temperature °C. | Pressing Time, Min. | Ls resin Face/Core % | IB, kg/cm² | Number Of layers |
|---|---|---|---|---|---|---|---|
| 1 | 395 | 12-1 | 180 | 3 | 50/0 | 9.8 | 3 |
|   |   | 12-2 | 180 | 3.5 | 50/30 | 4.0 | 3 |
| 2 | 397 | 13 | 180 | 3 | 50/0 | 8.8 | 3 |
| 3 | 398 | 14 | 180 | 3 | 50/0 | 7.8 | 3 |
| 4 | 398-2 | 14-2 | 180 | 3 | 50/0 | 6.8 | 3 |
| 5 | 399 | 19-1 | 180 | 3 | 50/0 | 8.6 | 3 |
|   |   | 19-2 | 180 | 3.5 | 50/30 | 4.4 | 3 |

TABLE 8-continued

Conditions of panels manufacturing and their properties.

| Trial No | Resin No | Panel No. | Pressing temperature ° C. | Pressing Time, Min. | Ls resin Face/Core % | IB, kg/cm² | Number Of layers |
|---|---|---|---|---|---|---|---|
| 6 | 400 | 20 | 180 | 3.0 | 50/0 | 8.2 | 3 |
|   |   | 20-1 | 180 | 3.5 | 50/30 | 4.4 | 3 |
| 7 | 413 | 56 | 180 | 3.5 | 50/30 | 1.8 | 3 |
| 8 | 400-1 | 19.3 | 180 | 3.5 | 50/0 | 10.6 | 3 |

Notes:
Density of all panels was about 0.7 g/cm³.

TABLE 9

Conditions of inventive graft copolymer resin synthesis using sodium lignosulfonate.

| Trial No/ No resin | Charge of formaldehyde, %. | Temperature, ° C. | Time, min. | PH. | Charge of unsaturated aldehyde, %. | Temperature, ° C. | Time, Min. | pH. |
|---|---|---|---|---|---|---|---|---|
| 1/388 | 8 | 95 | 5 | 9.5 | — | — | — | — |
| 2/390 | 5 | 99 | 5 | 9.0 | Acr. 2.1 | 28 | 120 | 8.5 |
| 3/409 | 8 | 95 | 5 | 9.0 | Acr. 2.1 | 30 | 120 | 8.5 |
| 4/414 | 8 | 95 | 5 | 9.0 | Acr. 2.1 | 30 | 120 | 8.5 |
| 5/390-1 | 0.1 | 99 | 5 | 9.0 | Acr. 2.1 | 28 | 120 | 8.5 |
| 6/228-1* | 8 | 80 | 5 | 9.5 | 2.1 | 80 | 120 | 8.5 |
| 7/228-2** | 8 | 80 | 5 | 9.5 | 2.1 | 80 | 120 | 8.5 |
| 8/327-1*** | 8 | 80 | 5 | 9.5 | 2.1 | 80 | 120 | 8.5 |
| 9/412 | 8 | 80 | 5 | 9.5 | — | — | — | — |
| 10/447-1 | 8 | 0 | 5 | 9.9 | 2.1 | 30 | 180 | 10.2 |

Notes:
Acr. = acrolein.
414-Synthesis in reverse order
228-1*-Azo initiator VA-80 −0.2%.
228-2**-Azo initiator VA-50 −0.2%.
327-1***-Ammonium persulfate initiator −0.3%.

TABLE 10

Conditions of panels manufacturing and their properties.

| Trial No | Resin No | Panel No. | Pressing temperature ° C. | Pressing Time, Min. | LS resin Face/Core % | IB, kg/cm² | Number Of layers |
|---|---|---|---|---|---|---|---|
| 1 | 388 | 144 | 170 | 5 | 20 | 7.8 | 1 |
| 2 | 390 | 157 | 170 | 5 | 20 | 11.4 | 1 |
| 3 | 390-1 | 158 | 170 | 5 | 20 | 4.9 | 1 |
| 4 | 409 | 52 | 180 | 3.5 | 50/30 | 7.2 | 3 |
| 5 | 414 | 57 | 180 | 3.5 | 50/30 | 5.6 | 3 |
|   |   | 58* | 180 | 3.5 | 50/30 | 6.8 | 3 |
|   |   | 60* | 190 | 3 | 50/30 | 6.8 | 3 |
| 6 | 409 | 63* | 180 | 3 | 50/30 | 3.8 | 3 |
|   |   | 63*-1 | 180 | 4 | 50/30 | 5.0 | 3 |
|   |   | 64 | 180 | 3 | 50/30 | 6.2 | 3 |
|   |   | 64-1 | 180 | 4 | 50/30 | 5.8 | 3 |
| 7 | 403 | 70* | 190 | 3 | 70/20 | 8.2 | 3 |
|   |   | 71* | 200 | 3 | 70/20 | 5.8 | 3 |
| 8 | 228-1 | 38-4 | 180 | 3 | 20 | 6.4 | 1 |
| 9 | 228-2 | 39-3 | 180 | 3 | 20 | 6.8 | 1 |
| 10 | 327-1 | 37-3 | 180 | 3 | 20 | 7.0 | 1 |

TABLE 10-continued

Conditions of panels manufacturing and their properties.

| Trial No | Resin No | Panel No. | Pressing temperature °C. | Pressing Time, Min. | LS resin Face/Core % | IB, kg/cm$^2$ | Number Of layers |
|---|---|---|---|---|---|---|---|
| 11 | 412 | 54 | 180 | 3.5 | 50/30 | 4.8 | 3 |
| 12 | 447-1 | 21 | 180 | 3 | 70/20 | 5.6 | 3 |

Notes:
Density of all panels was about 0.7 g/cm$^3$.
58*, 70*, 71*, - curing agent ammonium persulfate.
63* - curing agent maleic acid.
64*, 64-1* - curing agent malonic acid.
Resin No 403 - for conditions of manufacturing, see table 1.

TABLE 11

Conditions of inventive resin synthesis; LS-derived resins used in the UF resin synthesis process.

| Trial No/ No resin | Charge of formaldehyde, %. | Temperature, °C. | Time, min. | pH. | Charge of unsaturated aldehyde (acrolein), %. | Temperature, °C. | Time, min. | pH. |
|---|---|---|---|---|---|---|---|---|
| 1/483 | 8 | 95 | 5 | 10 | — | — | — | — |
| 2/469 | — | — | — | — | 4.2 | 30 | 3.00 | 9.1 |
| 3/486 | 8 | 93 | 5 | 10 | 2.1 | 28 | 3.0 | 10 |
| 4/475 | 8 | 95 | 5 | 10 | 1.05 | 29 | 3.0 | 10 |
| 5/478 | 8 | 95 | 5 | 10 | 2.1 | 29 | 3.0 | 10 |
| 6/450 | 8 | 95 | 5 | 10 | 2.1 | 30 | 3.0 | 10 |
| 7/489* | 8 | 95 | 5 | 10 | 2.1 | 30 | 3.0 | 10 |
| 8/434* | 8 | 95 | 5 | 9.2 | 2.1 | 29 | 3.0 | 9.5 |
| 9/470* | — | — | — | — | 4.2 | 31 | 3.0 | 9.1 |
| 10/487* | 8 | 95 | 5 | 10 | 2.1 | 29 | 3.0 | 10 |
| 11/485 | 8 | 95 | 5 | 10 | 2.1 | 30 | 3.0 | 10.1 |
| 12/469 | — | — | — | — | 2.1 | 30 | 3.0 | 10 |

Notes:
For all these resins (except 434 and 489), the end product included 60% LS-derived resin and 40% UF resin intermediate product.
489*. In preparing this resin, 80% LS-derived resin and 20% UF intermediate resin was used. The product had such a high viscosity that it could not be sprayed.
434*. 40% LS-derived resin from Calcium LS.
470*. LS derived resin was treated at 80° C. and pH 8.1 with 2.5% urea for 2 min before reaction with UF intermediate resin.
487*. LS derived resin was reacted with the UF intermediate at a pH of 6.5.

TABLE 12

Conditions of panels manufacturing and their properties.

| Trial No | Resin No | Panel No. | Pressing Temperature °C. | Pressing Time, min. | LS resin Face/Core % | IB, kg/cm$^2$ | Number of layers |
|---|---|---|---|---|---|---|---|
| 1 | 483 | 72 | 190 | 3 | 36 | 6.8 | 1 |
| 2 | 469 | 60 | 190 | 3 | 36 | 5.6 | 1 |
| 3 | 486 | 75 | 190 | 3 | 36 | 9.2 | 1 |
| 4 | 475 | 66 | 190 | 3 | 36 | 7.4 | 1 |
| 6 | 450 | 58 | 190 | 3 | 36 | 9.8 | 1 |
|   | 450 | 56 | 190 | 2 m. 45 sec. | 36 | 8.0 | 1 |
| 8 | 434 |    | 180 | 3 | 30 | 6.8 | 1 |
| 9 | 470 | 61 | 190 | 3 | 36 | 4.2 | 1 |
| 10 | 487 | 76 | 190 | 3 | 36 | 7.6 | 1 |
| 11 | 485 | 51 | 190 | 3 | 36 | 8.0 | 1 |
| 12 | 469 | 60 | 190 | 3 | 36 | 5.6 | 1 |

Notes:
Tables 11 and 12 are examples in which the inventive LS-derived resin was used as an additive in the polycondensation reaction by which standard UF resin is made. An example of this reaction is described in Example 13.

TABLE 13

| Sample ID | Resin ID | Resin | LS Face | LS Core | Density | Press Temp | Press Time | Total resin | Internal Bond | Modulus of Rupture | Modulus of Elasticity |
|---|---|---|---|---|---|---|---|---|---|---|---|
| 11 | — | 12 | — | — | 0.734 | 180 | 3.0 | — | 0.680 | 23.07 | 3,899 |
| 31 | — | 12 | — | — | 0.738 | 180 | 3.0 | — | 0.743 | 22.14 | 3,582 |
| 32 | 448 | 13 | 24 | 16 | 0.728 | 190 | 3.0 | 40% | 0.728 | 19.58 | 3,766 |
| 33 | 448 | 13 | 32 | 24 | 0.724 | 190 | 3.0 | 56% | 0.678 | 19.37 | 3,932 |
| 34 | 447 | 11 | 24 | 16 | 0.739 | 190 | 3.0 | 40% | 0.820 | 22.38 | 3,664 |
| 35 | 447 | 11 | 32 | 24 | 0.749 | 190 | 3.0 | 56% | 0.865 | 21.25 | 4,053 |
| 36 | 446 | 15 | 32 | 16 | 0.743 | 190 | 3.0 | 48% | 0.698 | 18.98 | 3,665 |
| 37 | 446 | 15 | 36 | 16 | 0.742 | 190 | 3.0 | 52% | 0.650 | 19.99 | 4,568 |
| 38 | 446 | 15 | 40 | 16 | 0.737 | 190 | 3.0 | 56% | 0.660 | 18.25 | 3,634 |
| 39 | 441 | 16 | 48 | 24 | 0.729 | 200 | 3.0 | 72% | 0.572 | 15.31 | 3,740 |
| 40 | 441 | 16 | 48 | 24 | 0.728 | 200 | 3.0 | 72% | 0.543 | 17.17 | 4,011 |
| 41 | 447 | 11 | 40 | 30 | 0.731 | 200 | 3.0 | 70% | 0.812 | 20.70 | 3,879 |
| 42 | 447 | 11 | 40 | 36 | 0.728 | 200 | 3.0 | 76% | 0.711 | 20.32 | 3,880 |
| 43 | 448 | 13 | 36 | 24 | 0.732 | 200 | 3.0 | 60% | 0.698 | 20.03 | 3,833 |
| 45 | 441/448 | 14 | 50 | 24 | 0.728 | 200 | 3.0 | 74% | 0.732 | 17.79 | 3,877 |
| 46 | 441/448 | 14 | 50 | 24 | 0.717 | 200 | 3.0 | 74% | 0.653 | 17.11 | 3,817 |
| 47 | 441/448 | 14 | 50 | 30 | 0.723 | 200 | 3.0 | 80% | 0.672 | 18.68 | 3,735 |
| 48 | 441/448 | 14 | 50 | 30 | 0.725 | 200 | 3.0 | 80% | 0.630 | 17.76 | 3,868 |
| 49 | 446 | 15 | 32 | 24 | 0.713 | 200 | 2.5 | 56% | 0.604 | 15.51 | 3,000 |
| 50 | 446 | 15 | 32 | 24 | 0.720 | 200 | 3.0 | 56% | 0.588 | 16.46 | 3,065 |
| 51 | 446 | 15 | 32 | 24 | 0.726 | 215 | 2.5 | 56% | 0.673 | 16.23 | 2,717 |
| 52 | 446 | 15 | 32 | 24 | 0.720 | 215 | 3.0 | 56% | 0.572 | 17.17 | 3,527 |
| 53 | 446 | 15 | 32 | 24 | 0.725 | 230 | 2.5 | 56% | 0.641 | 17.45 | 3,194 |
| 54 | 446 | 15 | 32 | 24 | 0.678 | 230 | 3.0 | 56% | 0.580 | 14.79 | 2,948 |

TABLE 14

| | Thickness Swell | | Water Absorption | | |
|---|---|---|---|---|---|
| Sample ID | 2 hour | 24 hour | 2 hour | 24 hour | Comments |
| 11 | 2.4 | 6.8 | 12.9 | 34.4 | Reference |
| 31 | 3.6 | 13.7 | 10.1 | 31.3 | Reference |
| 32 | 5.1 | 18.5 | 13.3 | 40.2 | |
| 33 | 3.9 | 14.1 | 11.7 | 33.2 | |
| 34 | 4.3 | 15.4 | 13.0 | 37.7 | |
| 35 | 4.7 | 17.1 | 13.8 | 41.9 | |
| 36 | 5.3 | 19.5 | 13.6 | 44.3 | |
| 37 | 5.3 | 20.4 | 14.6 | 46.1 | |
| 38 | 5.1 | 19.2 | 13.6 | 44.3 | |
| 39 | 11.6 | 33.5 | 23.1 | 64.6 | Difficulty spraying |
| 40 | 6.6 | 25.6 | 14.7 | 49.4 | Difficulty spraying |
| 41 | 3.9 | 10.4 | 10.7 | 26.9 | |
| 42 | 3.9 | 12.4 | 11.2 | 30.9 | |
| 43 | 3.6 | 10.1 | 12.4 | 28.9 | Formaldehyde test panel |
| 45 | 5.5 | 17.2 | 13.5 | 38.2 | |
| 46 | 5.7 | 16.6 | 13.1 | 36.0 | |
| 47 | 6.4 | 20.5 | 14.1 | 42.2 | |
| 48 | 6.7 | 21.1 | 15.0 | 43.6 | |
| 49 | 4.5 | 15.8 | 11.0 | 35.8 | These last six samples were used |
| 50 | 4.6 | 16.6 | 11.4 | 37.8 | To test for higher |
| 51 | 6.2 | 17.7 | 11.7 | 36.6 | Press temperature |
| 52 | 5.0 | 17.5 | 13.2 | 40.9 | And lower press |
| 53 | 4.9 | 17.5 | 13.7 | 42.6 | time. No catalyst |
| 54 | 5.1 | 19.6 | 15.1 | 47.4 | In face. |

Tables 13 and 14 give the plan of particleboard panel manufacturing trials using examples of resins produced according to this invention, and the average results from physical and mechanical tests of these panels. The panels were produced using conventional hot pressing technology. Blending of the wood particles with the binder was performed in a long-retention time rotary blender, with the spray nozzle set parallel to the long axis of the blender drum. The blended particles were band formed into a three layer mat 600 mm on each side. The reference panels were produced with commercially available UF resin.

The following standards were used in the physical and mechanical testing. ASTM 1037–98 was used for determination of moisture content (MC), density, static bending, modulus of rupture (MOR), apparent modulus of elasticity (MOE), tensile strength perpendicular to panel surface (IB), water absorption, and thickness swelling. ASTM 5582–94 was used for determination of formaldehyde emission, with ASTM E 1333–96 and EN 120 used for comparison thereto. ANSI A208.1–1993 was used for comparison and analysis of the results.

As to the physical properties of the panels, the color was excellent (the adhesive was clear, or very lightly colored), the density was in the range of 710–750 kg/m$^3$, the moisture content (MC) was in the typical range for industrial panels, and its variations were low.

As to the mechanical properties, the IB of all samples was higher than the requirement for medium density industrial panels, and some panels were significantly superior to the reference. The Modulus of Rupture MOR) of all samples was significantly higher than the requirement of the ANSI standard for commercial and industrial medium density particleboard. The Modulus of Elasticity (MOE) of all samples were higher than the requirements for all grades of industrial panels.

The formaldehyde emission obtained from panel 44 was lower than the requirement for any grade of industrial particleboard. The dessicator average value of 0.718 micrograms per ml corresponds to a large chamber value of 0.18 ppm. In North America, the limit is 0.30 ppm, and the target is typically 0.20 ppm.

The samples produced with the inventive binders thus exceeded the requirements of ANSI A208.1–1993 for medium density particleboard.

Figure 6:
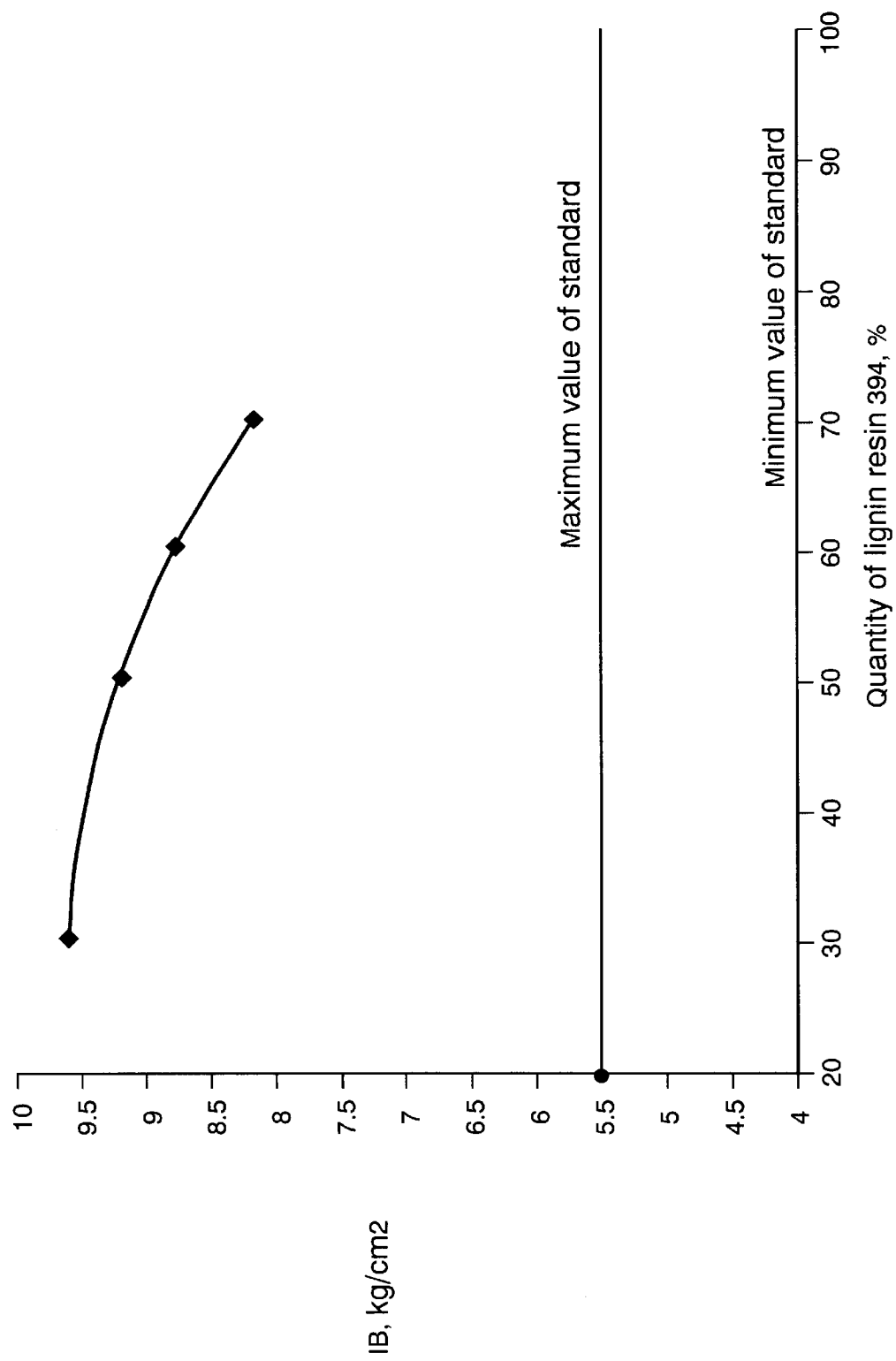
FIG. 6 is a graph showing the effect on board internal bond of the quantity of the inventive resin 394 in the face layer of a composition board.
Figure 7:
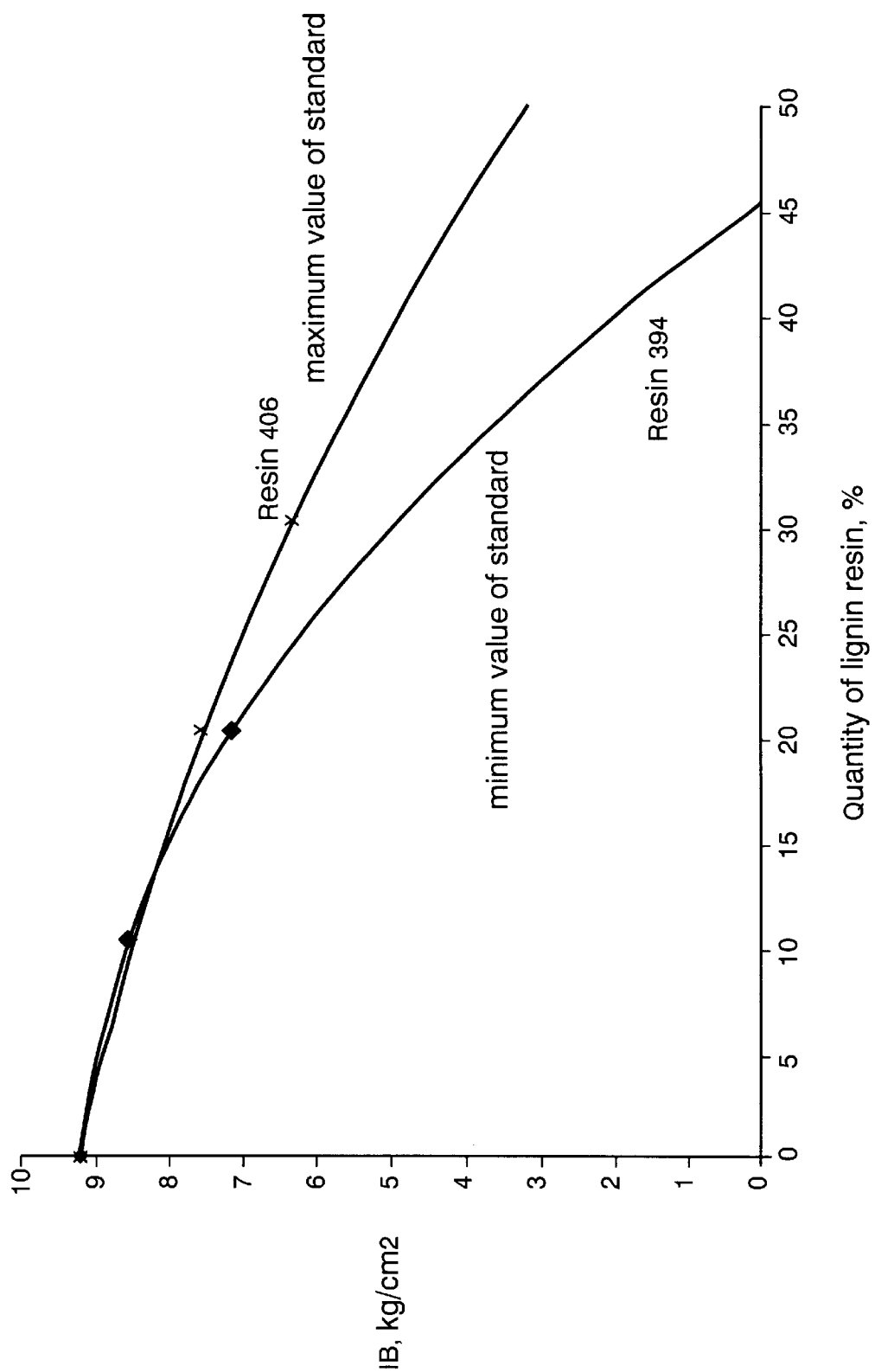
FIG. 7 is a graph showing the effect on board internal bond of the quantity of the inventive resin in the core layer of a composition board resins 394 and 406.
Figure 8:
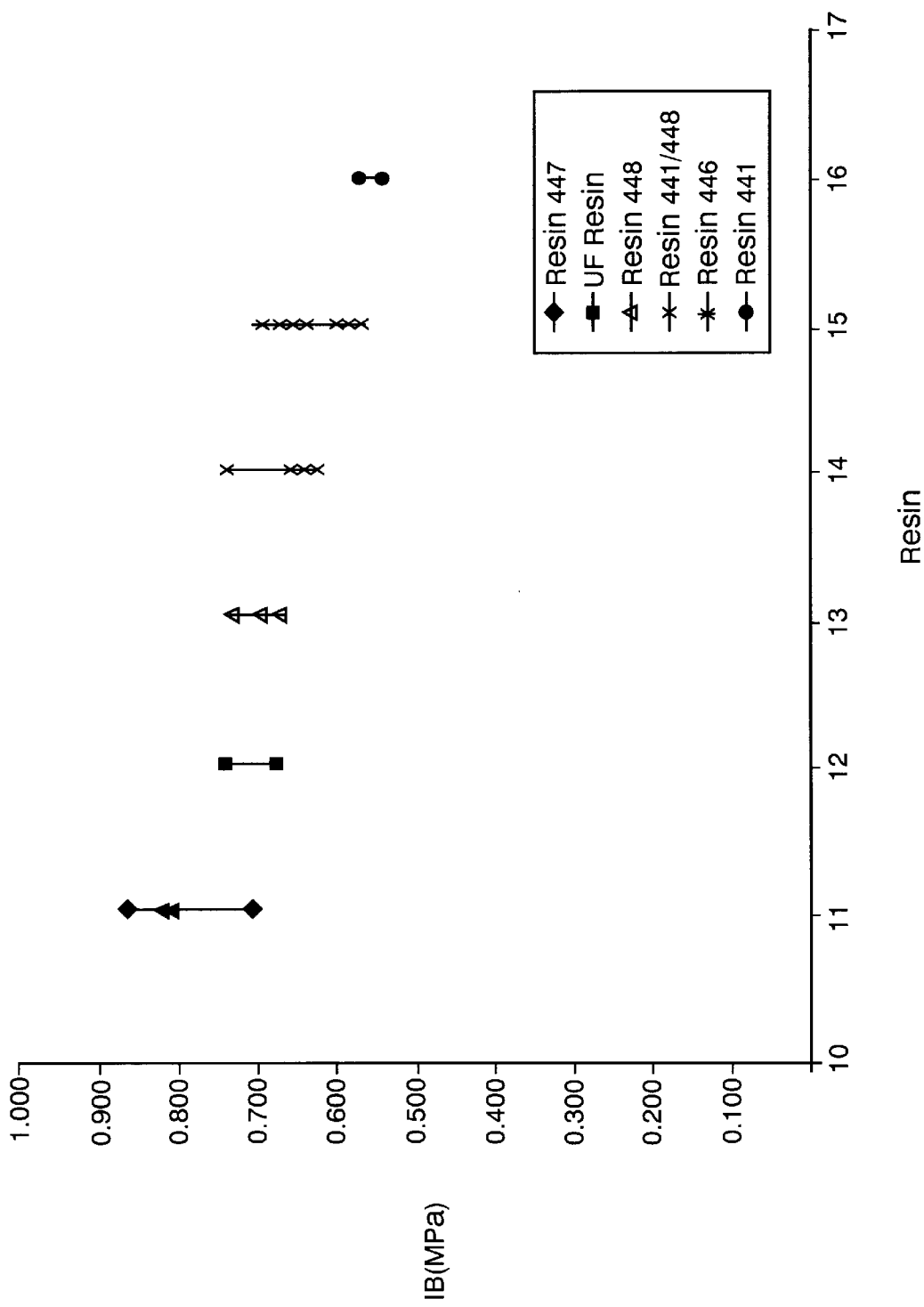
FIG. 8 is a graph showing the board internal bond with a number of different inventive resins in the three layers of a composition board.

The figures are plots of some of the data which are summarized in the tables. FIG. 1 shows the effect of the addition of commercially available UF resin on the viscosity of the inventive LS-derived resin. The addition of something less than 20% UF resin decreases the viscosity to the range in which it can be spray applied to wood strands/chips/ portions, as appropriate, in existing composite board manufacturing processes, which allows the inventive resin to be used as a direct substitute for UF resin in such processes. FIGS. 2–5 show effects of temperature on viscosity, for the pure resin, and for mixtures of the resin with UF resin, indicating another means of allowing the resin to be spray applied. In the figures where used, the "second heating" of a resin indicates that the viscosity was measured after the resin was re-heated, and was cooling back to room temperature. FIGS. 6–8 chart results of internal bond testing for particleboard made using the resins of this invention, supporting the conclusions that the resin can be used as a substitute for the majority (or all, in appropriate cases) of standard UF resins, and can be used as part of the UF resin production process. In FIG. 8, the range of internal bond results is shown for six different resins; the labeling on the x axis is only for convenience.

Other embodiments will occur to those skilled in the art from the following claims.

What is claimed is:

1. A lignosulfonate based thermosetting resin material, comprising the reaction product of lignosulfonate, an unsaturated aldehyde and a different aldehyde.

2. The composition board binding material of claim 1 in which said unsaturated aldehyde is acrolein.

3. The composition board binding material of claim 2 in which said acrolein is present in about 0.1–8% by weight of the solids content of the starting material.

4. The composition board binding material of claim 1 in which said unsaturated aldehyde is crotonaldehyde.

5. The composition board binding material of claim 1 in which said crotonaldehyde is present in about 0.1–10%, by weight of the solids content of the starting material.

6. The composition board binding material of claim 1 in which said unsaturated aldehyde is citral.

7. The composition board binding material of claim 1 in which said different aldehyde is formaldehyde.

8. The composition board binding material of claim 1 wherein said lignosufonate is present in an amount of about 70–95 percent by weight, said unsaturated aldehyde is present in an amount of about 0.1–10 percent by weight, and said different aldehyde is present in an amount of about 0.5–20 percent by weight, all by weight of the solids content of the starting material.

9. The composition board binding material of claim 1 produced by a first reaction of said lignosulfonate with one of said unsaturated aldehyde and said different aldehyde to produce a first reaction product, followed by a second reaction of said first reaction product with the other of said unsaturated aldehyde and said different aldehyde.

10. The composition board binding material of claim 9 in which said different aldehyde is formaldehyde, and said reaction involving said formaldehyde takes place at a basic pH and elevated temperature.

11. The composition board binding material of claim 9 in which said reaction involving said unsaturated aldehyde is a radical initiated reaction.

12. The composition board binding material of claim 11 in which said radical initiated reaction uses an initiator selected from the group of initiators consisting of hydrogen peroxide—Fe(II), an azo compound, an organic peroxide, and ammonium persulfate.

13. The composition board binding material of claim 10 wherein said basic pH is about 8–11.0 and said temperature is about 60–99 degrees C.

14. A method of producing a thermosetting lignosulfonate-based resin material, comprising:

providing a lignosulfate;

providing an unsaturated aldehyde;

providing a different aldehyde;

reacting in a first reaction the lignosulfonate with one of the unsaturated aldehyde and the different aldehyde, to create a first intermediate reaction product; and then reacting in a second reaction the first intermediate reaction product with the other of the turated aldehyde and the different aldehyde, to create the resin material.

15. The method of claim 14 further including:

providing urea;

providing formaldehyde;

reacting together in a third reaction the urea and formaldehyde at a basic PH, to begin a urea-formaldehyde reaction; and while the third reaction is proceeding, adding to the reaction mixture the resin material, to produce a lignosulfonate-urea-formaldehyde final product.

16. The method of claim 14 further including:

providing a urea-formaldehyde copolymer; and reacting in a third reaction the resin material and the copolymer, to produce a lignosulfonate-urea-formaldehyde resin material.

17. The method of claim 14 further including:

providing a urea-formaldehyde resin;

mixing the resin material with the urea-formaldehyde resin to create an adhesive mixture; and spray applying the mixture to wood particles, to assist in the adhesion of the wood particles.

18. The method of claim 15, wherein said resin material is present in an amount of up to about 80 percent by weight of the final product.

* * * * *